July 5, 1949.  C T. SMELZER  2,475,408
MEAT PRODUCT AND METHOD OF MAKING SAME
Filed Jan. 11, 1945
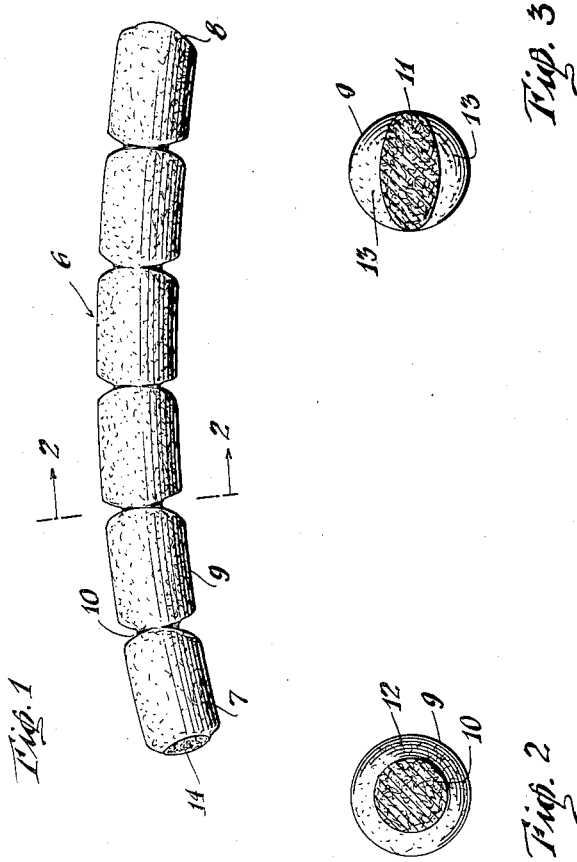
INVENTOR.
C Tracy Smelzer
BY
Frank A. Bauer
ATTORNEY Patented July 5, 1949

2,475,408

UNITED STATES PATENT OFFICE 2,475,408

MEAT PRODUCT AND METHOD OF MAKING SAME

C Tracy Smelzer, Forest Hills, N. Y., assignor to Claruel Food Products Corp., New York, N. Y., a corporation of New York Application January 11, 1945, Serial No. 572,319

4 Claims. (Cl. 99—107)

This invention relates to foodstuffs, and particularly to a composite meat material such as frankfurters.

The object of the invention is to provide the meat foodstuff in a convenient unit corresponding in general to the conventional frankfurter but treated and partially subdivided to make it more pleasing in appearance and palatable to the taste.

In the accompanying drawings illustrating the invention

Fig. 1 is a perspective view of my improved foodstuff unit;

Fig. 2 is a sectional view taken on the line 2—2 of Fig. 1 and slightly enlarged, and Fig. 3 is a sectional view similar to Fig. 2 but illustrating a modification.

Preferably the food article will be of a length and diameter corresponding in general to the conventional types of frankfurters, and it may be either of the contained or skinless form.

It comprises an elongated body 6 having ends 7 and 8 and intermediate portions 9 separated by relatively narrow connecting portions 10.

Preferably the composition corresponds to that of the frankfurter comprising compressed meat particles held together in a unit of sufficient rigidity to be handled without breaking apart. The unit as a whole may be partially cooked and in addition the surface portions of the new article further heat-treated by cooking or by toasting at the surface. Infra red or short-wave cooking may be employed and the meat composition may be formed into shape in steam jacketed molds. Where the material is already available in conventional frankfurter form the intermediate contractions may be made by hand crimping or tying or by cutting away material to form the recesses. The frankfurter skin may be tied tightly at the ends in usual manner and loosely at intermediate points to form the indentations, the tying cord being either retained or removed after the meat composition has become sufficiently consolidated to hold its shape.

The intermediate reduced portions 10 are of sufficient cross section to maintain the unitary rigidity of the article as a whole and may be of any desired shape. For instance, as shown in Fig. 2, they may be substantially circular giving an even reduction 12 from the larger diameter of the sections 9. As shown in Fig. 3 the reduced connecting portions may be of oval formation as indicated at 11, the larger axis of the ellipse being substantially the same as the diameter of the sections 9 while the smaller axis of the ellipse is reduced leaving arcuate portions 13 on each side.

Where the usual skin covering is maintained the ends of the covering will be tied or held together in conventional manner, and I have found that the intermediate reduced portions 10 of the unit will be maintained in the final article by the natural rigidity and shrinking of the material and the covering during the process of pressure and heat-treatment. Similarly with the skinless type of article, the heat-treatment is such as to impart to the material a sufficient rigidity to maintain the surface intact and preserve the shape imparted to the meat composition under pressure and heat.

The advantages of the new article of frankfurter type are a more pleasing appearance due to the successive arcuate sections at the surface and a more palatable taste in that a greater surface area is exposed to the cooking action of the heat. The divisions are preferably made of a size conveniently providing an easy length for biting off, making the article easier to handle and divide and consume in any desired manner. The cooking heat-treatment at the reduced connecting or neck portions will extend further in toward the center of the material so as to reach the interior portions and increase the relative amount of the surface effect with resultant improvement in taste. To this will, of course, be added the further effect of the final cooking at the time of consumption of the articles, this cooking effect being most pronounced at the areas of enlargement along the length of the article. The distribution of the reduced portions 10 gives an increased pliancy to the article as a whole so that it naturally tends to lie flat on a heating surface or roll or other support.

When the final article is to be contained within a protective covering, either natural or synthetic, the process of formation may be attained by a modification of the usual apparatus for frankfurter manufacture, adding to the tying mechanism a necking mechanism forming the reduced portions 10. The compression and compacting together with a heat-treatment sufficient to slightly rigidify the surface material will give a permanent set to the composition, the covering being correspondingly shrunken and fitted into place so that the final article has an appearance very similar to Fig. 1 but with the usual contracted ends of the covering showing at each end.

I claim:

1. A process of forming edible articles comprising dividing a meat foodstuff into small particles and extruding the mass into a strip of constant diameter substantially corresponding to that of the conventional frankfurter, feeding and covering said strip with a surface skin, tying off said skin with its contained strip into units each of a length corresponding to the conventional frankfurter and loosely tying each of said units at a plurality of intermediate points forming indentations extending substantially half way toward the center of the strip relatively compressing and compacting the adjacent material and leaving a continuous central core while dividing each unit into a series of sections and thus forming a plurality of relatively compact reduced portions spaced to leave intermediate full diameter sections, then selectively cooking said units and delivering them as a succession of articles each comprising full sized sections of relatively less cooked foodstuff and intervening reduced portions formed of more extensively cooked foodstuff compressed and compacted and extending relatively deeply toward the center to render the article pliant but rigidified sufficiently to be self-sustaining, and cutting said articles as individual units from said strip.

2. A process of forming an edible article as set forth in claim 1 in which tying cords applied at the intermediate indentations are removed after the surface treatment of the article.

3. A cooked edible article of meat foodstuff of size and elongated form corresponding to a conventional frankfurter comprising a series of full diameter sections joined together end to end by intervening relatively reduced portions formed by narrow penetrating indentations extending substantially halfway toward the center of the article and having a minimum diameter of material at said reduced portions forming with the central material of said full diameter sections a continuous core of meat foodstuff from end to end of the article and rendering the article pliant to tend to lie flat naturally on a supporting surface, the material of said reduced portions being of foodstuff extending in toward the center of the article and more compressed and compacted and more thoroughly cooked than the less cooked full diameter sections and leaving a rigidity sufficient to be self-sustaining, and with resultant improvement in taste.

4. An edible article as set forth in claim 3 in which the inner compact surfaces of the indentations are closely adjacent and separated from each other by an indented section of compacted, self-sustaining, heat coagulated foodstuff material more rigid than the full diameter sections.

C. TRACY SMELZER.

REFERENCES CITED

The following references are of record in the file of this patent:

UNITED STATES PATENTS

| Number | Name | Date |
| --- | --- | --- |
| 1,994,468 | Freeman | Mar. 19, 1935 |
| 2,107,166 | Rumsey, Jr. | Feb. 1, 1938 |
| 2,255,810 | Replogle | Sept. 16, 1941 |